US009019527B2

(12) United States Patent  
Omori

(10) Patent No.: US 9,019,527 B2  
(45) Date of Patent: Apr. 28, 2015

(54) IMAGE FORMING APPARATUS, IMAGE PROCESSING APPARATUS, IMAGE PROCESSING SYSTEM, IMAGE PROCESSING METHOD, PROGRAM, AND RECORDING MEDIUM

(75) Inventor: Tetsuhiko Omori, Chiba (JP)

(73) Assignee: Ricoh Company, Ltd, Tokyo (JP)

( * ) Notice: Subject to any disclaimer, the term of this patent is extended or adjusted under 35 U.S.C. 154(b) by 712 days.

(21) Appl. No.: 12/805,551

(22) Filed: Aug. 5, 2010

(65) Prior Publication Data

US 2011/0043853 A1 Feb. 24, 2011

(30) Foreign Application Priority Data

Aug. 21, 2009 (JP) ................................ 2009-192341

(51) Int. Cl.  
*G06F 3/12* (2006.01)  
*G06F 15/00* (2006.01)  
*H04N 1/44* (2006.01)  
*H04N 1/00* (2006.01)

(52) U.S. Cl.  
CPC ......... *H04N 1/4406* (2013.01); *H04N 1/00949* (2013.01); *H04N 1/444* (2013.01); *H04N 1/00214* (2013.01); *H04N 1/4413* (2013.01); *H04N 2201/0094* (2013.01)

(58) Field of Classification Search  
USPC ....................................................... 358/1.15  
See application file for complete search history.

(56) References Cited

U.S. PATENT DOCUMENTS

| | | | | |
|---|---|---|---|---|
| 5,819,040 | A * | 10/1998 | Ogaki et al. ................. | 709/217 |
| 2005/0134903 | A1 * | 6/2005 | Tanimoto et al. ............ | 358/1.15 |
| 2005/0280854 | A1 | 12/2005 | Sato | |
| 2007/0139701 | A1 * | 6/2007 | Nomura ....................... | 358/1.15 |
| 2007/0153319 | A1 * | 7/2007 | Moon et al. .................. | 358/1.15 |
| 2007/0201060 | A1 * | 8/2007 | Fukuda ........................ | 358/1.9 |
| 2008/0229306 | A1 | 9/2008 | Omori | |

(Continued)

FOREIGN PATENT DOCUMENTS

| | | |
|---|---|---|
| CN | 101465929 | 6/2009 |
| JP | 2001-358857 A | 12/2001 |

(Continued)

OTHER PUBLICATIONS

Chinese Office Action and English translation thereof dated Jun. 13, 2012.

(Continued)

*Primary Examiner* — Huo Long Chen  
(74) *Attorney, Agent, or Firm* — Harness, Dickey & Pierce, P.L.C.

(57) ABSTRACT

A disclosed image forming apparatus capable of delivering image data includes an image forming unit configured to read an image to generate image data, a workflow selection unit configured to receive selection of workflows each obtained by optionally combining input processing, image-conversion processing and output processing plug-ins for processing the generated image data, a storage unit configured to store data identification information for identifying desired electronic data, a data selection unit configured to receive selection of the desired electronic data, an electronic data acquisition unit configured to acquire the selected electronic data based on the corresponding data identification information, and a delivery processing unit configured to carry out delivery processing on the acquired electronic data and the generated image data based on a selected one of the workflows.

13 Claims, 26 Drawing Sheets

(56) References Cited

U.S. PATENT DOCUMENTS

2009/0158281 A1* 6/2009 Omori .......................... 718/101
2009/0251738 A1 10/2009 Nakahara

FOREIGN PATENT DOCUMENTS

| JP | 2006-018640 | 1/2006 |
| JP | 2008-311941 | 12/2008 |
| JP | 2009-021861 | 1/2009 |

OTHER PUBLICATIONS

Office Action issued Aug. 6, 2013 in Japanese Patent Application No. JP2009-192341.

Partial Japanese Office Action dated May 20, 2014 in corresponding Application No. 2009-192341.

* cited by examiner

FIG.10

| DELIVERY TYPE | REQUIREMENT FOR DELIVERABLE ELECTRONIC DATA |
|---|---|
| SMTP DELIVERY | FILE SIZE < 3 MB && DATA != zip |
| WebDAV DELIVERY | FILE SIZE < 3 MB |
| SHARED FOLDER DELIVERY && FTP DELIVERY | ANY DATA |
| DELIVERY TYPE OTHER THAN ABOVE | (DATA == tiff \|\| DATA == jpeg) && RESOLUTION < 300 dpi && FILE SIZE < 100 MB |

FIG.11

| DELIVERY DESTINATION | REQUIREMENT FOR DELIVERABLE ELECTRONIC DATA |
|---|---|
| user@sample.com | FILE SIZE < 3 MB |
| *@group.sample.com | FILE SIZE < 3 MB && DATA != zip |
| user[1-9]@support.sample.com \|\| ¥¥FileServer.local¥* \|\| ftp://FtpServer.local/* | ANY DATA |
| guest@sample.com | FILE SIZE < 10 MB && (DATA == tiff \|\| DATA == jpeg) |
| senduser@computer.sample.com && http://webserver.sample.com/* | DATA == jpeg && RESOLUTION < 300dpi |
| senduser2@computer.sample.com \|\| senduser3@computer.sample.com | DATA == tiff && RESOLUTION < 300dpi |

FIG.12

| USER | REQUIREMENT FOR DELIVERABLE ELECTRONIC DATA |
|---|---|
| user1 | FILE SIZE < 3 MB && DATA!= zip |
| user2 | FILE SIZE < 3 MB |
| ACCESS RIGHT A | ANY DATA |
| user-ad*@admin.sample.com \|\| user3 | (DATA == tiff \|\| DATA == jpeg) && RESOLUTION < 300 dpi && FILE SIZE < 100 MB |
| (ACCESS RIGHT A && ACCESS RIGHT B) \|\| ACCESS RIGHT C | DATA == zip |

FIG.13A

| USER NAME | ACCESS RIGHT GIVEN TO USER |
|---|---|
| User1 | ACCESS RIGHT A, ACCESS RIGHT B |
| User2 | ACCESS RIGHT C |
| User3 | ACCESS RIGHT A, ACCESS RIGHT C |
| User4 | ACCESS RIGHT C, ACCESS RIGHT D |

FIG.13B

| DATA NAME | REQUIRED ACCESS RIGHTS |
|---|---|
| ¥¥FileServer¥1.tif | ACCESS RIGHT A |
| ¥¥FileServer¥2.tif | ACCESS RIGHT B |
| ¥¥FileServer¥3.tif | ACCESS RIGHT A OR ACCESS RIGHT C |
| ftp://MyFtpServer.local/1.tif | ACCESS RIGHT C AND ACCESS RIGHT D |

FIG.14A

| BIBLIOGRAPHY | BIBLIOGRAPHIC VALUE |
|---|---|
| DOCUMENT NAME | EVALUATION RESULT |
| CREATION DATE | 2009/07/21 |
| NUMBER OF PAGES | 20 |
| RESOLUTION | 600 dpi |
| USER NAME | User1 |

FIG.14B

| BIBLIOGRAPHIC INFORMATION | CORRESPONDING ELECTRONIC DATA |
|---|---|
| DOCUMENT NAME = "EVALUATION RESULT" | ¥¥FileServer¥1.tif |
| CREATION DATE = [20000101 - 20091231] | ¥¥FileServer¥2.tif |
| DOCUMENT NAME = "EVALUATION RESULT" && NUMBER OF PAGES < 10 | ¥¥FileServer¥3.tif |
| RESOLUTION < 300 dpi | ftp://MyFtpServer.local/1.tif |
| DOCUMENT NAME = "EVALUATION RESULT" \|\| DOCUMENT NAME = " REPORT" | http://CompanyPage.local/Mypage.html<br>¥¥FileServer2¥Sample.pdf |

FIG.15

| NAME OF WORKFLOW | ELECTRONIC DATA TO BE USED |
|---|---|
| Workflow 1 | ¥¥FileServer¥1.tif |
| Workflow 2 | ftp://MyFtpServer.local/2.tif |
| Workflow 3 | http://MyHomePage.local/Mypage.html |
| Workflow 4 | ¥¥FileServer2¥Sample.pdf |

FIG.16

| NAME OF IMAGE FORMING APPARATUS | SELECTABLE ELECTRONIC DATA |
|---|---|
| MFP 1 | \\FileServer\1.tif<br>\\FileServer\2.tif<br>\\FileServer\3.tif |
| MFP 2 | ftp://MyFtpServer.local/1.tif<br>ftp://MyFtpServer.local/2.tif |
| MFP 3 | http://MyHomePage.local/Mypage.html<br>http://CompanyPage.local/Mypage.html<br>http://World.local/Mypage.html |
| Scanner 1 | \\FileServer2\Sample.pdf |

FIG.17

| NAME OF WORKFLOW | SELECTABLE ELECTRONIC DATA |
|---|---|
| Workflow 1 | ¥¥FileServer¥1.tif<br>¥¥FileServer¥2.tif<br>¥¥FileServer¥3.tif<br>ftp://MyFtpServer.local/1.tif |
| Workflow 2 | ftp://MyFtpServer.local/1.tif<br>ftp://MyFtpServer.local/2.tif |
| Workflow 3 | http://MyHomePage.local/Mypage.html<br>http://CompanyPage.local/Mypage.html<br>http://World.local/Mypage.html |
| Workflow 4 | ¥¥FileServer2¥Sample.pdf |

IMAGE FORMING APPARATUS, IMAGE PROCESSING APPARATUS, IMAGE PROCESSING SYSTEM, IMAGE PROCESSING METHOD, PROGRAM, AND RECORDING MEDIUM

BACKGROUND OF THE INVENTION

1. Field of the Invention

The invention generally relates to an image forming apparatus capable of delivering image data, an image processing apparatus, an image processing system, an image processing method, a computer program thereof, and a recording medium having such a computer program.

2. Description of the Related Art

Recently, image input-output apparatuses such as multifunctional peripherals are increasingly located or connected over a network in many corporate environments. Such image input-output apparatuses have improved the work efficiency dramatically. In the image input-output apparatuses, image processing systems that can efficiently convert paper documents into electronic documents to deliver the converted electronic documents draw much attention in terms of enhancing work efficiency. Major components of the image processing system include an image input apparatus such as an image forming apparatus and an image processing server. In the image processing server, various delivery processing menus suitable for various services and applications are registered in advance. A user of the image forming apparatus selects one of the processing menus suitable for a particular service such as scanning to read a document via an operation panel (operation section) of the image forming apparatus.

Japanese Patent Application Laid-Open Publication No. 2006-018640, for example, discloses an image data delivery processing technology in which an administrator combines plug-in programs to create input-conversion-output workflows and to carry out image data delivery processing based on the created input-conversion-output workflows.

However, in the above image processing system, when the user desires to deliver already converted electronic data, the user needs to print out the electronic data on paper and then scan the data printed on paper. In such image processing system, the input-conversion-output workflows already created are not used for scanning data, and hence it is not environmentally friendly and not efficient to print the electronic files on paper merely for carrying out delivery processing.

SUMMARY OF THE INVENTION

It is a general object of at least one embodiment of the present invention to provide an image forming apparatus that substantially eliminates one or more problems caused by the limitations and disadvantages of the related art. Accordingly, embodiments of the present invention may provide a novel and useful image forming apparatus, image processing apparatus, image processing system, image processing method, computer program thereof, and recording medium having such a computer program solving one or more of the problems discussed above. More specifically, the embodiments of the present invention may provide an image forming apparatus, an image processing apparatus, an image processing system, an image processing method, a computer program thereof, and a recording medium having such a computer program capable of carrying out delivery processing on scanned data and already converted electronic data based on the workflow by making the already converted electronic data selectable.

According to one embodiment, there is provided an image forming apparatus capable of delivering image data. The image forming apparatus includes: an image forming unit configured to read an image to generate image data; a workflow selection unit configured to receive selection of workflows each obtained by optionally combining input processing, image-conversion processing and output processing plug-ins for processing the generated image data; a storage unit configured to store data identification information for identifying desired electronic data; a data selection unit configured to receive selection of the desired electronic data; an electronic data acquisition unit configured to acquire the selected electronic data based on the corresponding data identification information; and a delivery processing unit configured to carry out delivery processing on the acquired electronic data and the generated image data based on a selected one of the workflows.

According to another embodiment, there is provided an image processing apparatus capable of delivering image data. The image processing apparatus includes: an image data acquisition unit configured to acquire image data; a workflow execution unit configured to acquire an execution request for executing one of workflows each obtained by optionally combining input processing, image-conversion processing and output processing plug-ins for processing the acquired image data; an identification information acquisition unit configured to acquire data identification information for identifying desired electronic data; an electronic data acquisition unit configured to acquire the desired electronic data based on the acquired data identification information; and a delivery processing unit configured to carry out delivery processing on the acquired electronic data and image data based on the acquired execution request for executing the one of the workflows.

According to still another embodiment, there is provided an image processing system that includes: an image forming apparatus; and an image processing apparatus connected to the image forming apparatus via a network. In the image processing system, the image forming apparatus includes an image forming unit configured to read an image to generate image data; a workflow selection unit configured to receive selection of workflows each obtained by optionally combining input processing, image-conversion processing and output processing plug-ins for processing the generated image data; a storage unit configured to store data identification information for identifying desired electronic data; a data selection unit configured to receive selection of the desired electronic data; and a transmission unit configured to transmit the generated image data, a selected one of the workflows, and the data identification information for identifying desired electronic data to the image processing apparatus. Further, in the image processing system, the image processing apparatus includes a reception unit configured to receive the transmitted image data, the transmitted workflow, and the transmitted data identification information; an electronic data acquisition unit configured to acquire the electronic data based on the received data identification information; and a delivery processing unit configured to carry out delivery processing on the acquired electronic data and the received image data based on the received workflow.

According to still another embodiment, there is provided a method for processing image data in an image forming apparatus capable of delivering the image data. The method includes: reading an image to generate image data; receiving selection of workflows each obtained by optionally combining input processing, image-conversion processing and output processing plug-ins for processing the generated image data; receiving selection of desired electronic data; acquiring data identification information for identifying desired electronic data; acquiring the desired electronic data based on the acquired data identification information; and carrying out delivery processing on the acquired electronic data and the generated image data based on the selected one of the workflows.

According to still another embodiment, there is provided a computer-readable storage medium that stores a computer program which, when executed by a processor, causes an image forming apparatus capable of delivering image data to perform an image process. The image process includes: reading an image to generate image data; receiving selection of workflows each obtained by optionally combining input processing, image-conversion processing and output processing plug-ins for processing the generated image data; receiving selection of desired electronic data; acquiring data identification information for identifying the desired electronic data; acquiring the desired electronic data based on the acquired data identification information; and carrying out delivery processing on the acquired electronic data and the generated image data based on the selected one of the workflows.

BRIEF DESCRIPTION OF THE DRAWINGS

Other objects and further features of embodiments will be apparent from the following detailed description when read in conjunction with the accompanying drawings, in which:

FIG. 10 is a table illustrating an example of restriction information based on delivery types;

FIG. 11 is a table illustrating an example of restriction information based on a delivery destination;

FIG. 12 is a table illustrating an example of restriction information based on users;

FIGS. 13A and 13B are tables illustrating examples of restriction information based on users access rights;

FIGS. 14A and 14B are tables illustrating examples of restriction information based on bibliographic information;

FIG. 15 is a table illustrating an example of restriction information based on workflows and associated electronic data set by an administrator;

FIG. 16 is a table illustrating an example of restriction information based on image forming apparatuses (i.e., MFPs and scanner apparatus);

FIG. 17 is a table illustrating an example of restriction information based on workflows;

DESCRIPTION OF THE PREFERRED EMBODIMENTS

In the following, an image processing system, an image forming apparatus, an image processing apparatus (i.e., an image processing server), an image processing method, a computer program thereof, and a recording medium having such a computer program according to embodiments of the present invention will be described with reference to the accompanying drawings.

Note that in the descriptions of the following embodiments, a multifunction peripheral (MFP) having functions of a printer, a scanner, a copier, and a facsimile machine is given as an example of an image forming apparatus to which image data are input; however, the image forming apparatus is not limited to such a multifunctional apparatus having these functions. Any apparatuses including a scanner apparatus, a facsimile apparatus, and a copier apparatus may be used as the image forming apparatus according to the following embodiments.

[First Embodiment]
<System and Hardware Configurations>

Figure 1:
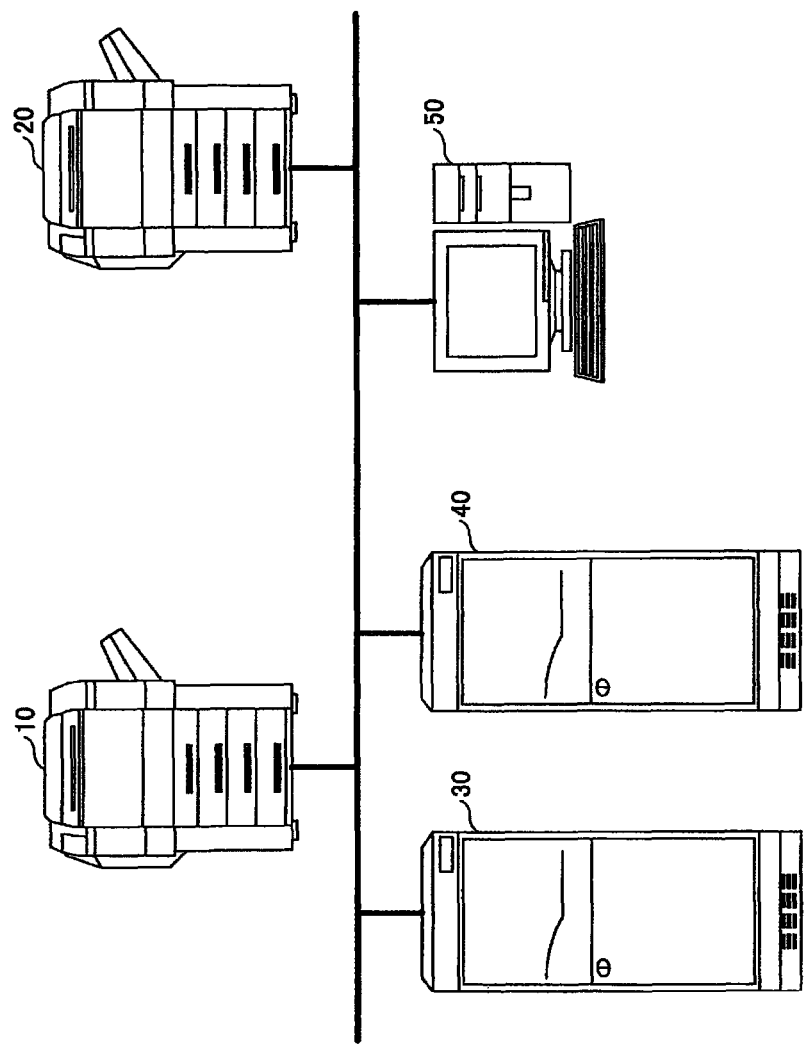
FIG. 1 is a diagram illustrating an example of an image processing system according to a first embodiment of the invention.

FIG. 1 is a diagram illustrating an example of an image processing system according to a first embodiment. As illustrated in FIG. 1, the image processing system includes first and second multifunction peripherals (MFPs) 10, 20, an image processing server 30, an image management server 40, and an information processing terminal 50 such as a personal computer (PC) or a personal data assistance (PDA), which are all connected via a network.

The first and second MFPs 10, 20 are configured to integrate functions of a scanner, a copier, a printer, and a facsimile machine in one case. In the first and second MFPs 10, 20, the scanner function scans images on a paper medium or the like to generate image data and transmits the generated image data to the image processing server 30. Details of the first and second MFPs 10, 20 are described later. Note that in the following embodiments, the image data includes image data on documents.

The image processing server 30 is a workstation type computer that receives the image data scanned by each of the first and second MFP 10, 20 and executes various types of processing or delivery processing based on a specified workflow. Workflows include email transmission, facsimile transmission and folder delivery.

The image processing server 30 is configured to execute the specified workflow based on the input image data, so that the image processing server 30 accumulates document data and carries out the delivery processing on the accumulated document data based on the workflow constructed by a user. That is, the image processing server 30 functions as the image processing apparatus in terms of image processing. Details of the image processing server 30 is described later. Note that the image processing server 30 may be incorporated in the first and second MFPs 10, 20.

The image management server 40 is configured to manage image data delivered from the image processing server 30. The image management server 40 is also capable of registering image types of accumulated image data or searching for particular image data.

In the information processing terminal 50, an administrator is allowed to initiate a management tool relating to data delivery and to create a workflow by sequentially selecting input, image-conversion, and output plug-ins. Note that the numbers of MFPs, servers, and information processing terminals connected via the network may be optionally determined.

Figure 2:
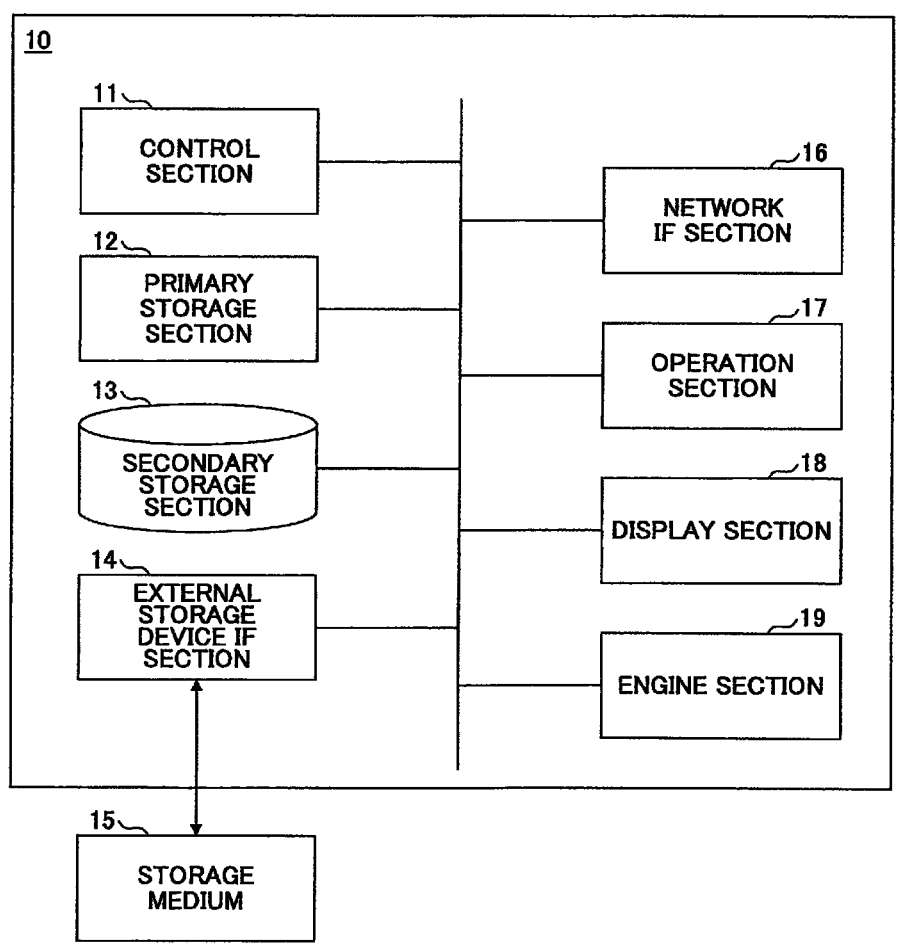
FIG. 2 is a block diagram illustrating a hardware configuration example of an image forming apparatus (i.e., a multifunctional peripheral, MFP) according to the first embodiment.

Next, hardware configurations of the MFP 10 and the image processing server 30 according to the first embodiment are described. FIG. 2 is a block diagram illustrating a hardware configuration example of the MFP 10 according to the first embodiment.

As illustrated in FIG. 2, the MFP 10 includes a control section 11, a primary storage section 12, a secondary storage section 13, an external storage device IF section 14, a network IF section 16, an operation section 17, a display section 18, and an engine section 19.

The control section 11 functions as a CPU that controls devices or carries out operation or processing on data in a computer. The control section 11 also functions as an arithmetic unit capable of executing a computer program stored in the primary storage section 12. The control section 11 receives data from an input device or a storage device, carries out operation or processing on the received data, and outputs the resulting data via an output device or the storage device.

The primary storage section 12 is a storage device such as a read only memory (ROM) or a random access memory (RAM) that permanently or temporarily stores computer programs or data including basic software of an operating system (OS) or application software to be executed by the control section 11.

The secondary storage section 13 is a storage device such as a hard disk drive (HDD) that stores data relating to the application software.

The external storage device IF section 14 functions as an interface between the MFP 10 and a recording medium 15 (e.g., a flash memory) that is connected to the MFP 10 via a data transmission path such as a universal serial bus (USB).

Predetermined computer programs stored in the recording medium 15 are installed in the MFP 10 via the external storage device IF section 14, so that the installed predetermined computer programs are ready to be executed in the MFP 10.

The network IF section 16 is an interface between the MFP 10 and peripheral devises having communication functions connected via the networks such as a local area network (LAN) and a wide area network (WAN) which are composed of data transmission paths such as wired and/or wireless lines.

The operation section 17 and the display section 18 are respectively an input device composed of keys (hard keys) and a display device composed of a liquid crystal display (LCD) having a touch panel function (including GUI software keyboard). The operation section 17 and the display section 18 function as user interfaces (UIs) when the user desires to execute the functions of the MFP 10.

The engine section 19 is a mechanical section that functions as a plotter or a scanner apparatus to actually carry out image forming processing.

Figure 3:
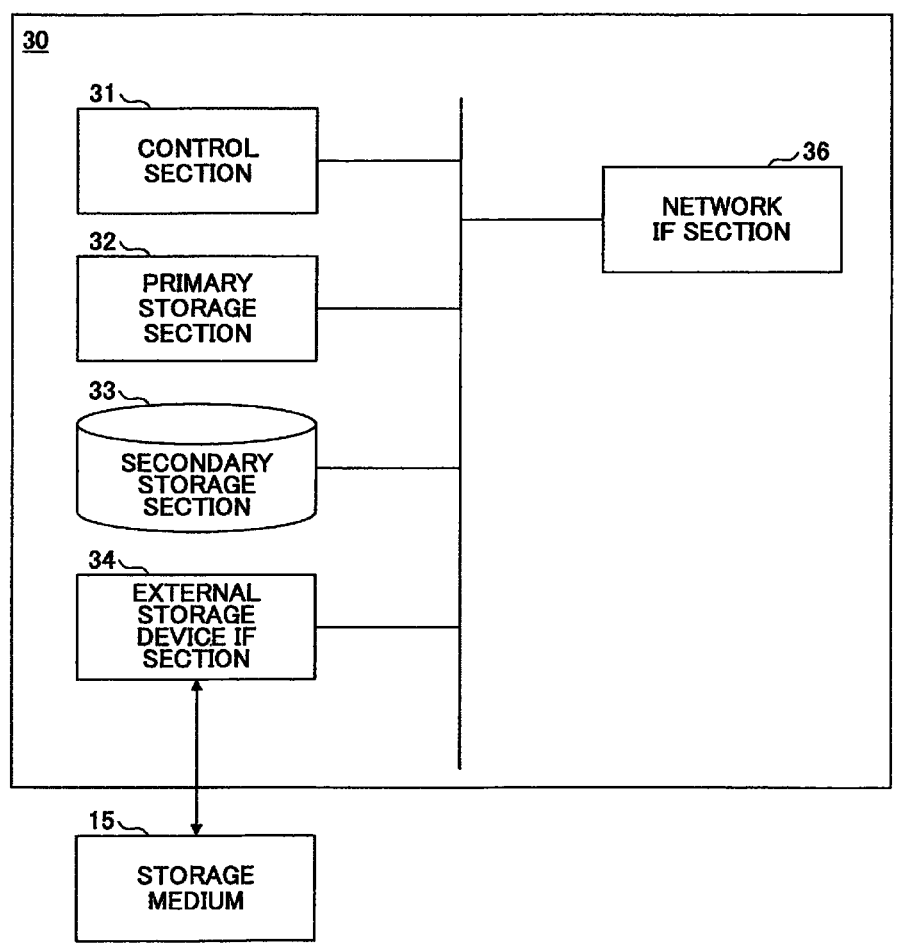
FIG. 3 is a block diagram illustrating a hardware configuration example of an image processing apparatus (i.e., an image processing server) according to the first embodiment.

FIG. 3 is a block diagram illustrating a hardware configuration example of the image processing server 30 according to the first embodiment. As illustrated in FIG. 3, the image processing server 30 includes a control section 31, a primary storage section 32, a secondary storage section 33, an external storage device IF section 34, and a network IF section 36.

The control section 31 functions as a CPU that controls devices or carries out operation or processing on data in a computer. The control section 31 also functions as an arithmetic unit capable of executing a computer program stored in the primary storage section 32. The control section 31 receives data from an input device or a storage device, carries out operation or processing on the received data, and outputs the resulting data to an output device or the storage device.

The primary storage section 32 is a storage device such as a read only memory (ROM) or a random access memory (RAM) that permanently or temporarily stores computer programs or data including basic software of an operating system (OS) or application software to be executed by the control section 31.

The secondary storage section 33 is a storage device such as a hard disk drive (HDD) that stores data relating to the application software.

The external storage device IF section 34 functions as an interface between the image processing server 30 and a recording medium 15 (e.g., a flash memory) that is connected to the image processing server 30 via a data transmission path such as a universal serial bus (USB).

Predetermined computer programs stored in the recording medium 15 are installed in the image processing server 30 via the external storage device IF section 34 so that the installed predetermined computer programs are ready to be executed in the image processing server 30.

The network IF section 36 is an interface between the image processing server 30 and peripheral devises having communication functions connected via the networks such as a local area network (LAN) and a wide area network (WAN) composed of data transmission paths such as wired and/or wireless lines. Note that an input section and a display section do not appear in the example of the image processing server 30 illustrated in FIG. 3, however, the image processing server 30 may include the input section and the display section.

<Functional Configuration>

Figure 4:
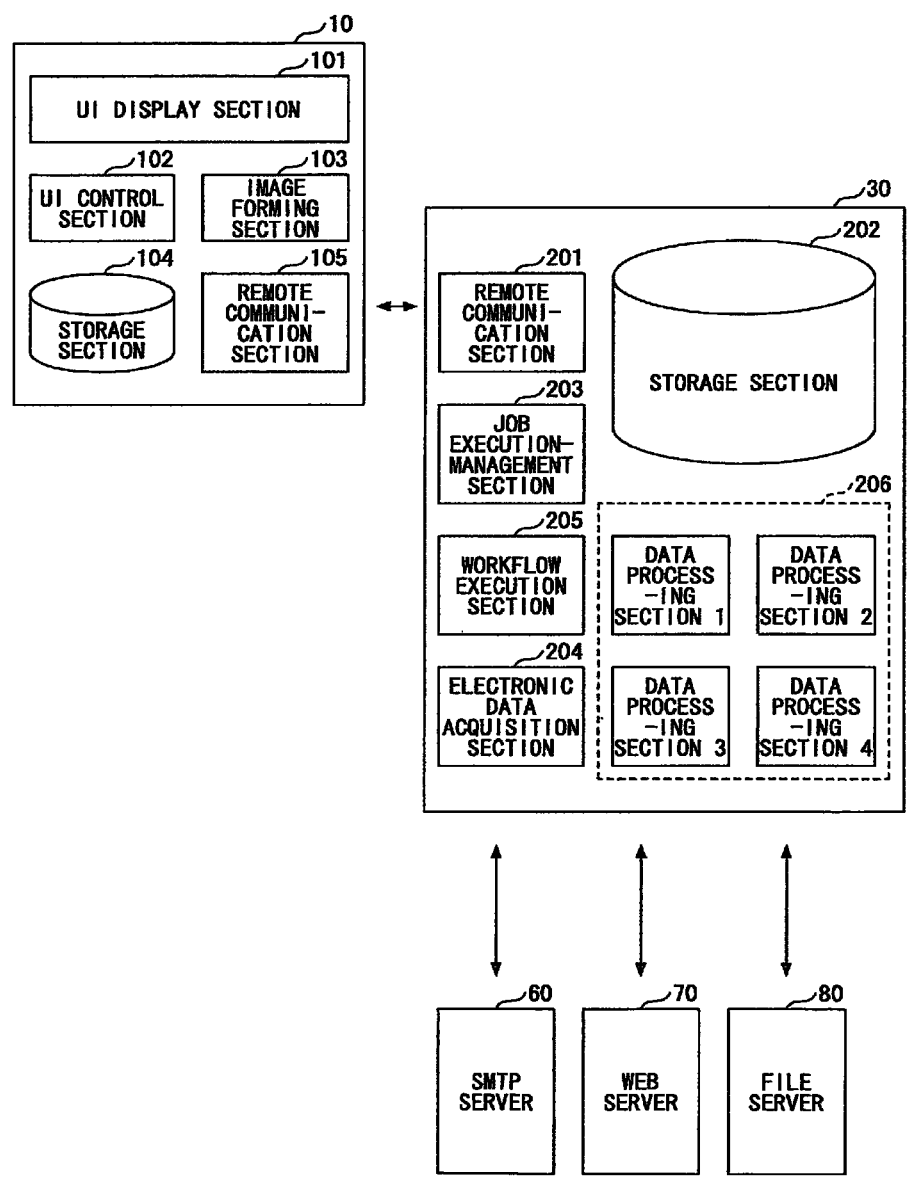
FIG. 4 is a block diagram illustrating functional configuration examples of the image forming apparatus (i.e., MFP) and the image processing apparatus (i.e., image processing server) according to the first embodiment.

FIG. 4 is a block diagram illustrating functional configuration examples of the MFP 10 and the image processing server 30 according to the first embodiment. First, a functional configuration of the MFP 10 is described. Note that the examples of the MFP 10 and the image processing server illustrated in FIG. 4 are separately configured; however, the image processing server 30 may be incorporated in the MFP 10.

As illustrated in FIG. 4, the MFP 10 includes a UI display section 101, a UI control section 102, an image forming section 103, a storage section 104, and a remote communication section 105. Other functions such as a printer function, a copier function, or facsimile function in a general MFP are not depicted in FIG. 4.

The UI display section 101 is an operations panel, which corresponds to the display section 18 of the MFP 10. The UI control section 102 instructs the UI display section 101 which content is to be displayed on a screen based on each set of screen information.

The UI control section 102 receives a workflow selected by the user. Note that the workflow indicates a processing flow obtained by optionally combining input processing, image-conversion processing, and output processing plug-ins. The input processing plug-in includes scanning input and facsimile reception. The image-conversion processing plug-in includes PDF conversion and JPEG conversion. The image-conversion processing plug-in includes email (SMTP) transmission and folder delivery.

Figure 5:
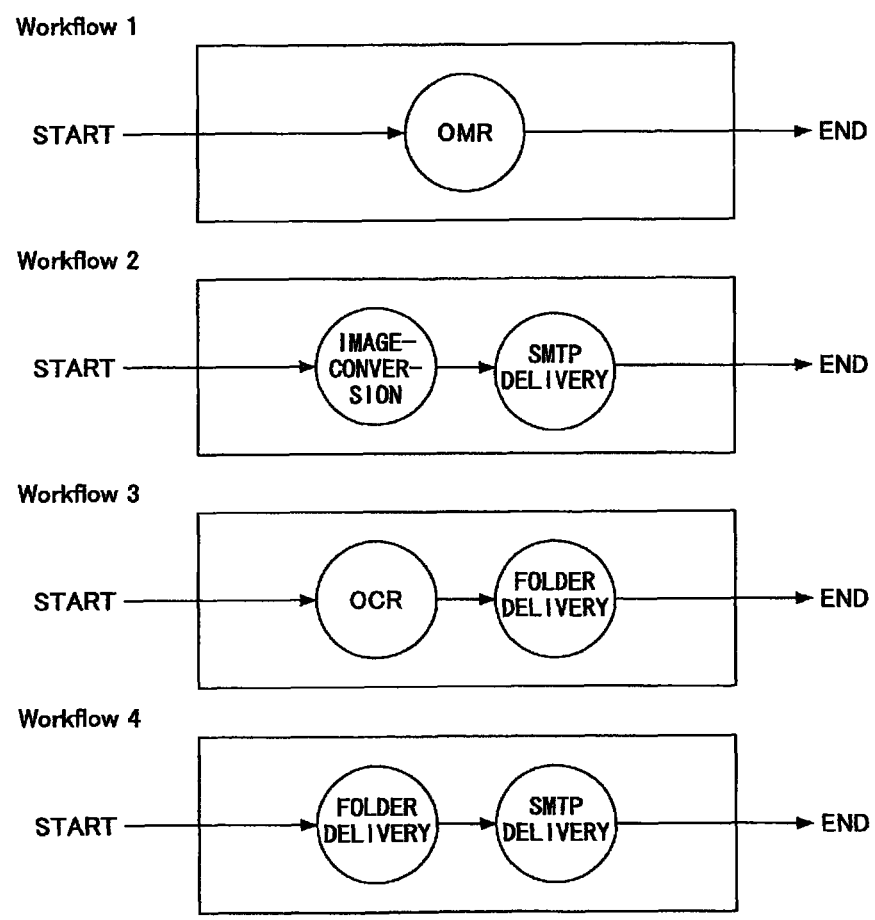
FIG. 5 is a diagram illustrating examples of workflows 1 through 4.

FIG. 5 is a diagram illustrating examples of workflows 1 through 4. In FIG. 5, the workflow 1 depicts a workflow of carrying out optical mark recognition (OMR) processing. The workflow 2 depicts a workflow of carrying out image-conversion and carrying out SMTP transmission. The workflow 3 depicts a workflow of carrying out OCR processing and carrying out folder delivery. The workflow 4 depicts a workflow of carrying out folder delivery and carrying out SMTP transmission.

Figure 6:
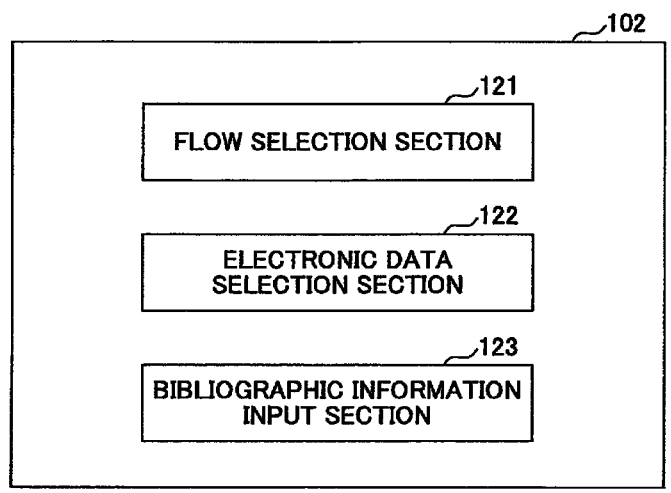
FIG. 6 is a block diagram illustrating a functional configuration example of a UI (user interface) control section of the image forming apparatus (i.e., MFP) according to the first embodiment.
Figure 7:
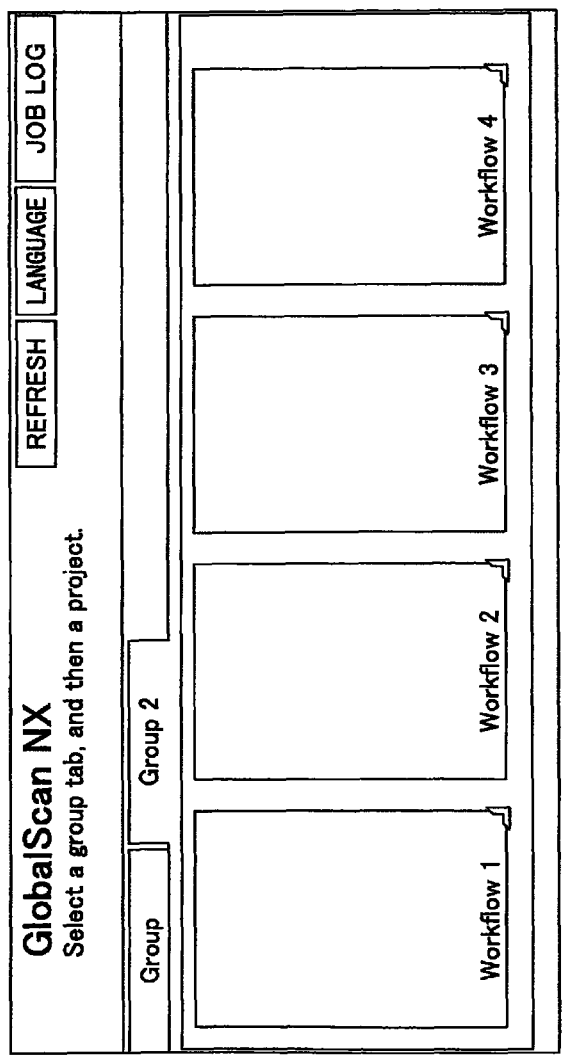
FIG. 7 is a diagram illustrating an example of a workflow selection screen.

FIG. 6 is a block diagram illustrating a functional configuration example of a UI (user interface) control section 102. The UI control section 102 includes a flow selection section 121, an electronic data selection section 122, and a bibliographic information input section 123. The flow selection section 121 displays a workflow selection screen having one or more workflows and receives a desired one of the workflows selected by the user. FIG. 7 is a diagram illustrating an example of a workflow selection screen. As illustrated in FIG. 7, the workflow selection screen is configured such that a desired one of the workflows 1 through 4 may be selected by the user.

Referring back to FIG. 6, an electronic data selection section 122 displays an electronic data selection screen via which a desired one of the electronic data that are delivered based on the selected workflow is selected by the user. The electronic data selection section 122 also receives a desired one of the electronic data selected by the user. Note that the electronic data selection section 122 displays the electronic data selection screen via which a file path or a file name of electronic data may be selected or may be directly input by the user.

Figure 8:
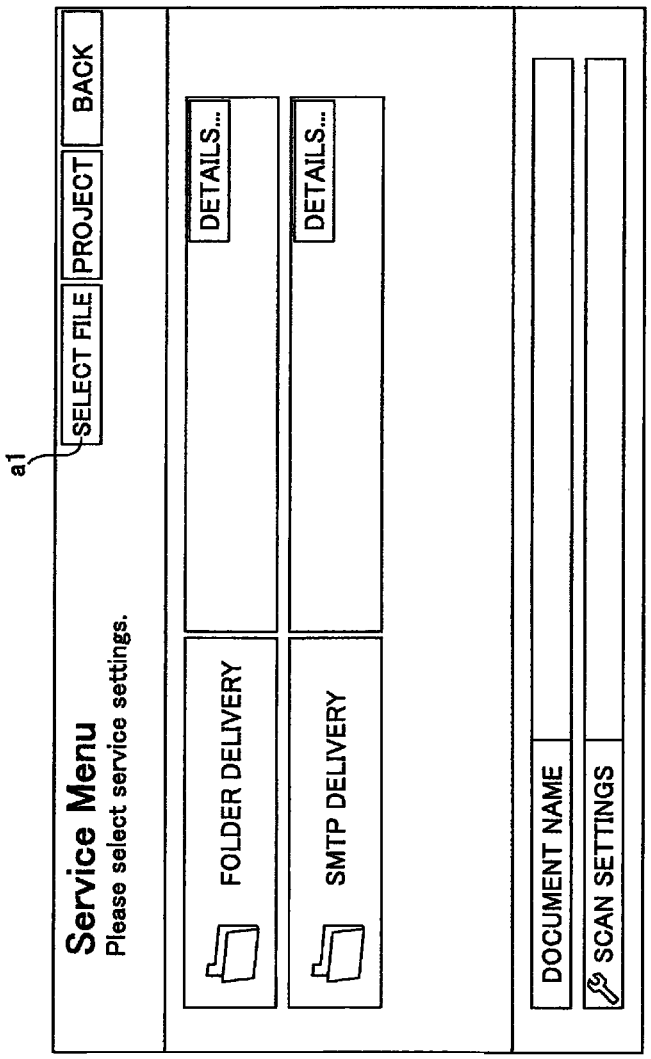
FIG. 8 is a diagram illustrating an example of a screen after one of the workflows displayed on the workflow selection screen has been selected.

FIG. 8 is a diagram illustrating an example of a screen after the desired one of the workflows displayed on the workflow selection screen has been selected. In the example in FIG. 8, the selected workflow includes two delivery processing types, that is, the folder delivery processing and the SMTP delivery processing. As illustrated in FIG. 8, the user presses al button on this screen to select desired electronic data.

Figure 9:
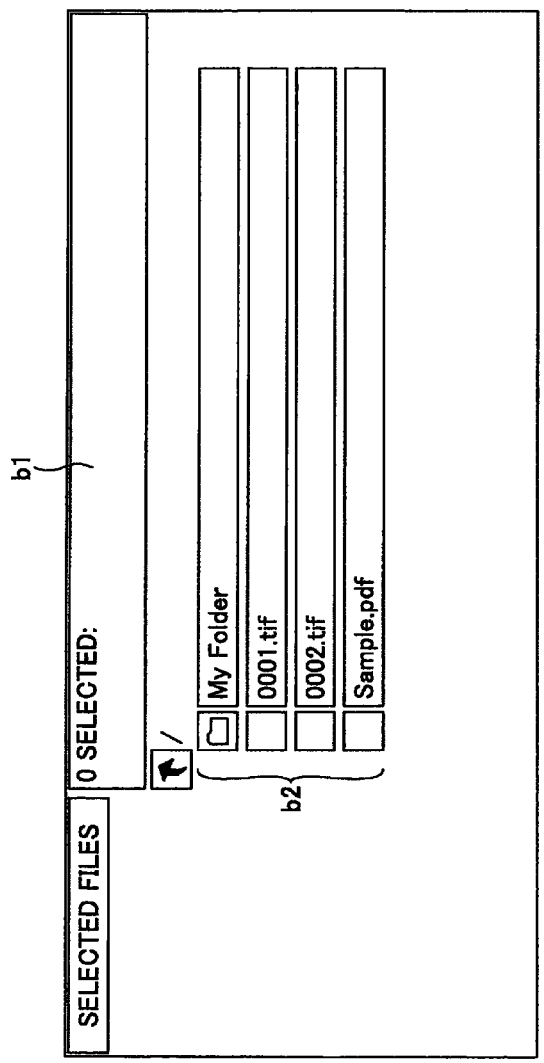
FIG. 9 is a diagram illustrating an example of an electronic data selection screen.

FIG. 9 is a diagram illustrating an example of an electronic data selection screen. In FIG. 9, if a desired file is selected, the selected file is displayed in b1 area, and a list of selectable files and folders is displayed in b2 area on the electronic data selection screen. When the user selects desired one or more files or folders listed in b2 area, the selected files and folders are displayed in b1 area.

Referring back to FIG. 6, a bibliographic information input section 123 displays a bibliographic information input screen (not shown) and receives input bibliographic information input by the user. The bibliographic information for image-conversion processing includes, for example, image formats and image sizes, and the bibliographic information for email delivery includes a delivery destination such as email addresses. A user ID as the bibliographic information is acquired from user information of a log-in user who has logged into a system.

Referring back to FIG. 4, the image forming section 103 reads a paper-based document via the scanner function to generate image data. The storage section 104 stores information on a cooperative image processing server 30, and the like.

The remote communication section 105 carries out transmission or reception of apparatus information or image data. When the user requests a workflow processing on the image data or specifies electronic data, the remote communication section 105 transmits electronic data identification information for identifying the image data, its request, and the electronic data to the image processing server 30. Note that the bibliographic information or the electronic data identification information is hereafter called "delivery setting information".

Next, a functional configuration of the image processing server 30 is described. The image processing server 30 includes a remote communication section 201, a storage section 202, a job execution-management section 203, an electronic data acquisition section 204, a workflow execution section 205, and a data processing section 206.

The remote communication section 201 carries out transmission or reception of apparatus information or image data. Specifically, the remote communication section 201 receives image data or delivery setting information from the MFP 10, and transmits the processed image data to a delivery address of the workflow.

When the remote communication section 201 receives a workflow processing request (i.e., a job request) from the MFP 10, the remote communication section 201 transmits the delivery setting information and the like to a job execution-management section 203.

The storage section 202 stores input processing, image-conversion processing, and output processing plug-ins, and also stores one or more workflows formed by combining any of the input processing, image-conversion processing, and output processing plug-ins. The storage section 202 also stores a job composed of the delivery setting information and the image data received from the MFP 10. Further, the storage section 202 stores screen information displayed on the UI display section 11 of the MFP 10 illustrated in FIGS. 7 to 9. The storage section 202 stores electronic file identification information for identifying electronic files associated with electronic file names over the network. The electronic file identification information may be one of a file path indicating a storage destination of an electronic file, a file name, and a file ID, or a combination of any of the three (file path, file name, and file ID).

The job execution-management section 203 stores the delivery setting information, the image data, or the electronic data identification information received from the MFP 10 as a job in the storage section 202, and transmits a request for processing the job to the workflow execution section 205. Note that if the delivery setting information includes the electronic data identification information, the job execution-management section 203 acquires the electronic data specified by the electronic data identification information via the electronic data acquisition section 204 and transmits the acquired electronic data to the workflow execution section 205. The electronic data acquisition section 204 acquires the electronic data based on the electronic data identification information in the delivery setting information obtained from the job execution-management section 203. Note that the electronic data identification information is a file path (location information) that locates the storage destination of the electronic data.

The electronic data acquisition section 204 may associate the obtained electronic data with a job composed of the delivery setting information and the image data and store the associated electronic data in the storage section 202. The electronic data acquisition section 204 may acquire the electronic data identification information stored in the storage section 202 and acquire the electronic data from the storage destination specified by the electronic data identification information.

When the workflow execution section 205 receives a job processing request from the job execution-management section 203, the workflow execution section 205 controls different processing contained in the workflow. Further, when the data processing section 206 receives a processing execution instruction from the workflow execution section 205, the data processing section 206 executes delivery processing on the image data and electronic data based on the received processing execution instruction.

That is, the data processing section 206 sequentially executes different processing in the workflow and delivers the processed image data and electronic data to the delivery destination. In FIG. 4, the data processing section 206 includes data processing sections 1 through 4, which carry out image-conversion processing, SMTP transmission, folder transmission, and the like.

An SMTP server 60 is a server compatible with a Simple Mail Transfer Protocol that is an Internet standard for electronic mail (e-mail) transmission across Internet Protocol (IP) networks. A Web server 70 is configured to accumulate information including HTML documents and images, and transmit such information via the networks such as the Internet in response to a client software request using a Web browser as a client. A file server 80 is configured to accumulate shared files over the Internet and manage such files.

Thus, the image processing system according to the first embodiment having the above-described functions is capable of carrying out delivery processing on the image data scanned by the MFP 10 and the specified (selected) electronic data.

In the image processing system according to the first embodiment, the electronic data capable of being selected by the user (i.e., the number of selectable electronic data) may be restricted in the electronic data selection section 122. Information for restricting the selection of electronic data is called "restriction information". Various types of restrictions made on the selectable electronic data are described below with reference to FIGS. 10 through 17.

(Restriction Information Based on Delivery Types)

FIG. 10 is a table illustrating an example of restriction information based on delivery types. The restriction information illustrated in FIG. 10 defines requirements for deliverable electronic data based on delivery types in the workflow. In the example in FIG. 10, in order to deliver a file via the SMTP delivery, the file needs to have a file size less than 3 MB and a data format other than a zip format. Further, in a case of the shared folder delivery and FTP delivery, any type of data may be delivered via the shared folder delivery and FTP delivery. Accordingly, the selectable electronic data (i.e., the number of selectable electronic data) may be restricted based on delivery types in the workflow subject to execution.

The restriction information may also include the following additional items:
  wild card characters (e.g., "*", "?")
  regular expression
  conditional operators such as an AND condition "&&", an OR condition "||", and an order of condition evaluation "( )" The following restriction information may also include the above additional items.

(Restriction Information Based on Delivery Destination)

FIG. 11 is a table illustrating an example of restriction information based on a delivery destination. The restriction information illustrated in FIG. 11 defines requirements for deliverable electronic data based on the delivery destination including email addresses or file paths in the delivery setting information. In the example in FIG. 11, in order to deliver a file to an email address "user@sample.com", the file needs to have a file size less than 3 MB. In addition, in order to deliver a file to a delivery destination having a domain name "group-.sample.com", the file needs to have a file size less than 3 MB and a data format other than a zip format. Note that the delivery destination may be a file path. Accordingly, the selectable electronic data (i.e., the number of selectable electronic data) may be restricted based on the delivery destination in the delivery setting information.

(Restriction Information Based on Users)

FIG. 12 is a table illustrating an example of restriction information based on users. The restriction information illustrated in FIG. 12 defines requirements for deliverable electronic data based on users in the delivery setting information. In the example in FIG. 12, in order to deliver a file to a user "user 1", the file needs to have a file size less than 3 MB and a data format other than a zip format. Note that a user name "user 1" may be acquired from a log-in user name of the MFP 10 contained in the delivery setting information.

Further, the requirement may be restricted based on authorization types assigned to users in addition to user names. For example, the requirement may be restricted based on various access rights. Accordingly, the selectable electronic data (i.e., the number of selectable electronic data) may be restricted based on the users in the delivery setting information.

(Restriction Information Based on Authorization or Access Rights)

FIGS. 13A and 13B are tables illustrating examples of restriction information based on users' access rights. The restriction information illustrated in FIGS. 13A and 13B defines requirements for deliverable electronic data based on authorization (i.e., access rights) given to users. FIG. 13A illustrates different access rights given to corresponding users. FIG. 13B illustrates different access rights required for corresponding electronic data.

In the examples in FIGS. 13A and 13B, a user having a user name "User 1" has access rights A and B, so that the user "User 1" is authorized to access the electronic data "¥¥FileServer¥1.tif" based on the access right A and the electronic data "¥¥FileServer¥1.tif" based on the access right B. Accordingly, different types of access rights may be given to the corresponding users, and only the users having certain access rights for certain electronic data are allowed to access such electronic data.

(Restriction Information Based on Bibliographic Information)

FIGS. 14A and 14B are illustrating examples of restriction information based on bibliographic information. FIG. 14A illustrates an example of bibliographic information of image data. FIG. 14B illustrates an example of electronic data corresponding the bibliographic information of image data. In the examples of FIGS. 14A and 14B, each of bibliographic information is associated with corresponding electronic data, which is defined as the restriction information. For example, if a document name is "evaluation result", selectable electronic data is "FileServer¥1.tif".

If the electronic data are located on the web (Http://---), a rendered Web page image may be converted into an electronic data as an image data or an HTML text itself may be converted into an electronic data. The above selection may be set in advance by users.

Accordingly, the selectable electronic data (i.e., the number of selectable electronic data) may be restricted based on the bibliographic information in the delivery setting information.

(Restriction Information Based on Administrators' Settings)

FIG. 15 is a table illustrating example of restriction information based on administrators' settings. In the example of FIG. 15, the administrator associates workflows with corresponding electronic data to be used in the workflows, which is defined as the restriction information. For example, if a "workflow 1" is executed, the corresponding electronic data "¥¥FileServer¥1.tif" is automatically delivered according to the workflow 1. Likewise, if a "workflow 2" is executed, the corresponding electronic data "ftp://MyHomePage.local/Mypate.html" is automatically delivered according to the workflow 2. Accordingly, if the electronic data that are definitely delivered are determined according to the workflows, such restriction information based on the administrators' settings may be more efficient.

(Restriction Information Based on Image Forming Apparatuses)

FIG. 16 is a table illustrating an example of restriction information based on image forming apparatuses. In the examples of FIG. 16, different selectable electronic data are associated with each of the image forming apparatuses, which is defined as the restriction information. For example, if the image forming apparatus is an "MFP1", the corresponding selectable electronic data associated with the MFP1 are "¥¥FileServer¥1.tif", "¥¥FileServer¥2.tif", and "¥¥FileServer¥3.tif". Likewise, the image forming apparatus is a "Scanner 1", the corresponding selectable electronic data associated with the Scanner 1 are "¥¥FileServer¥Sample.pdf". Note that the image forming apparatuses are not limited to the MFPs but include a scanner and the like. Accordingly, the selectable electronic data (i.e., the number of selectable electronic data) may be restricted based on the MFPs that have acquired the image data information or the delivery setting information.

(Restriction Information Based on Workflows)

FIG. 17 is a table illustrating an example of restriction information based on workflows. In the examples of FIG. 17, different selectable electronic data are associated with the corresponding one of workflows 1 through 4, which is defined as the restriction information. For example, the selectable electronic data "ftp://MyFtpServer.loc1/1.tif", and "ftp://MyFtpServer.loc1/2.tif" are associated with the workflow 2. Likewise, the selectable electronic data "http://MyHomePage.local/Mypage.html", "http://CompanyPage.local/Mypage.html", and "http://World.local/Mypage.htm" are associated with the workflow 3. Accordingly, the selectable electronic data (i.e., the number of selectable electronic data) may be restricted based on the workflow selected by the user.

Note that the above described restriction information may be stored in the storage section 104 of the MFP 10, the storage section 202 of the image processing server 30, or any other storage sections of the apparatuses. The electronic data selection section 122 restricts the selection of the electronic data (i.e., the number of selectable electronic data) to be displayed on the electronic data selection screen by referring to the restriction information.

Note that when the electronic data selection section 122 refers to the restriction information illustrated in FIG. 10 to FIG. 12, the selectable electronic data selected based on the corresponding parameters are displayed on the electronic data selection screen.

Figure 18:
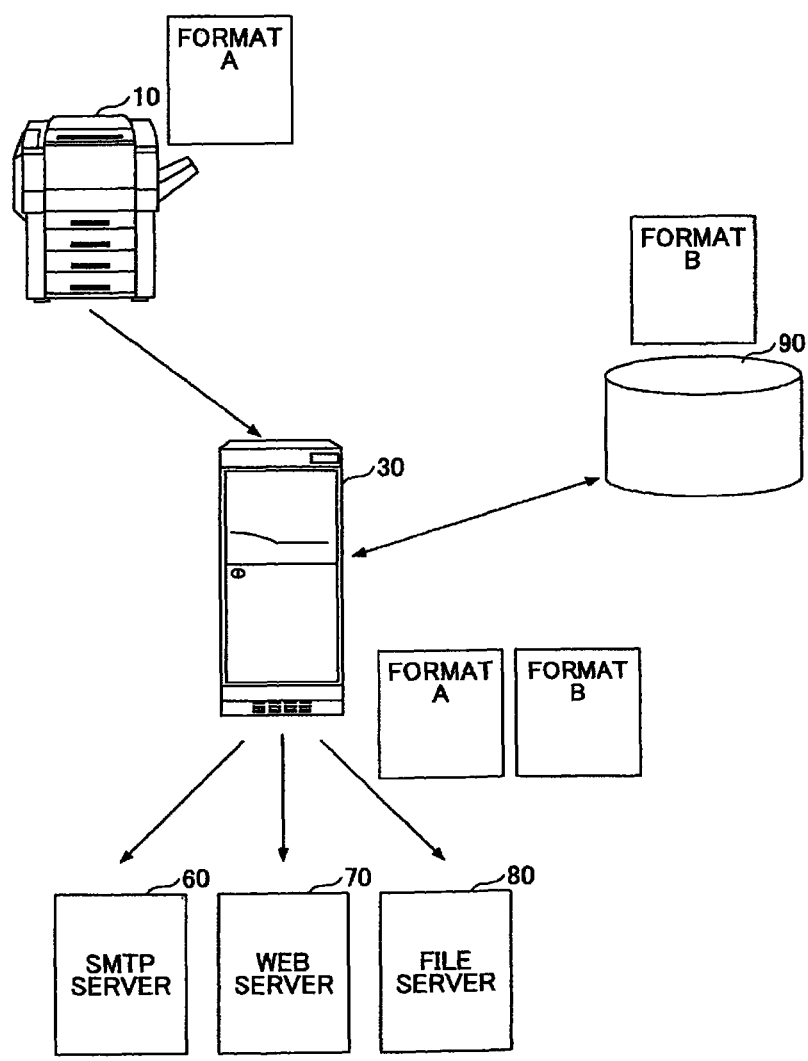
FIG. 18 is a diagram illustrating image delivery processing (first type) according to the first embodiment.

Here, the concept of image delivery processing according to the first embodiment is described below. FIG. 18 is a diagram illustrating an example of the image delivery processing (first type) according to the first embodiment. As illustrated in FIG. 18, the MFP 10 transmits the scanned image data to the image processing server 30 together with the delivery setting information. The image processing server 30 acquires the electronic data based on the electronic data identification information contained in the delivery setting information from a file server 90, for example. If the image identification information is, for example, a file path, the image processing server 30 acquires the electronic data tracing the corresponding file path.

Next, the image processing server 30 delivers the image data (having a format A) and the electronic data (having a format B) based on the workflow contained in the delivery setting information. FIG. 18 illustrates the example where the selected workflow includes no image-conversion processing, and the image data and the electronic data are delivered in different data formats.

In the FIG. 18, if the scanned image data is image data in a jpeg format of the minutes of a meeting, and the electronic data are a table made by a spreadsheet application such as Microsoft Excel or a presentation document made by a presentation application such as Microsoft PowerPoint used in the meeting, such data are attached to the image data of the minutes as supplemental documentation in the image processing server 30.

Figure 19:
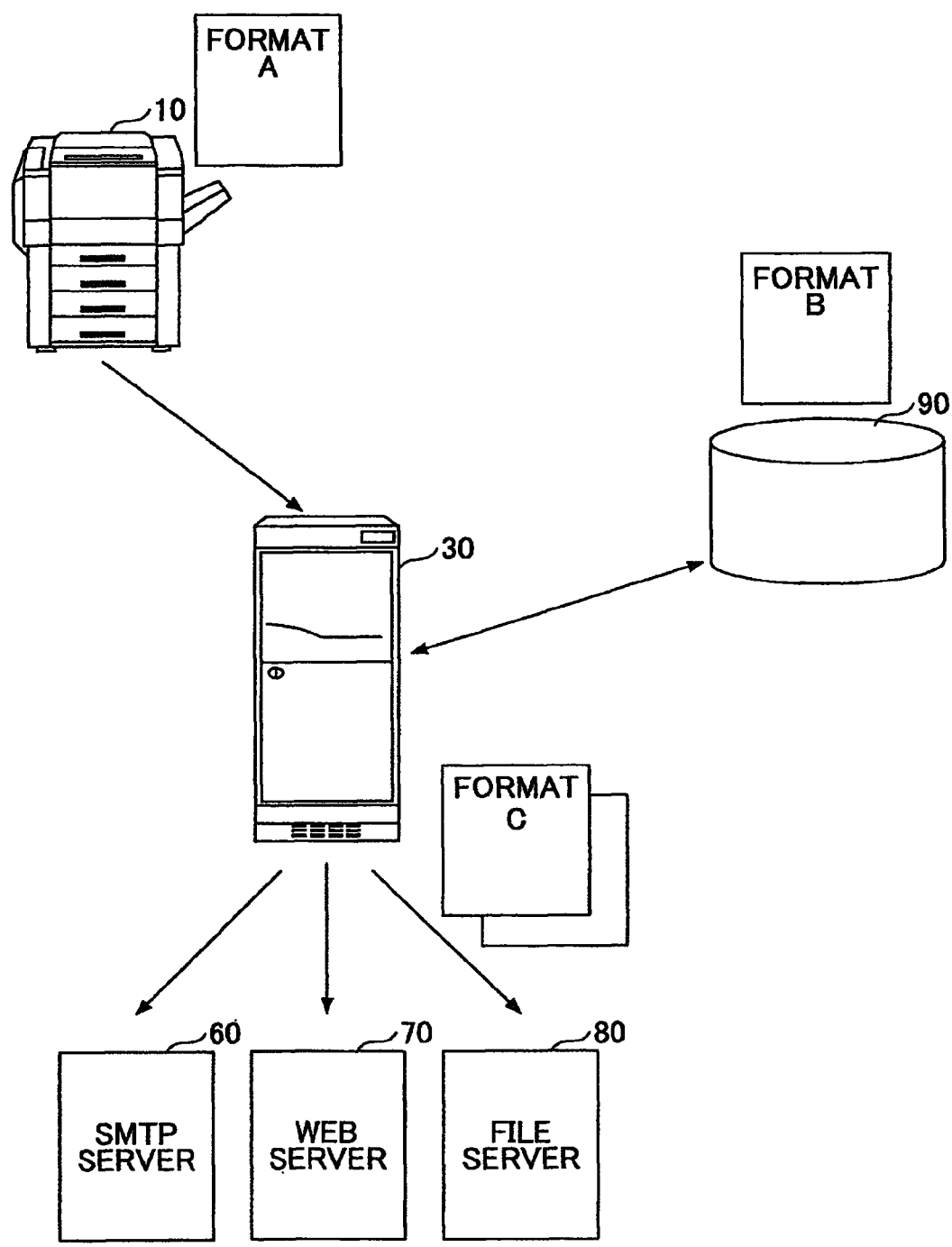
FIG. 19 is a diagram illustrating image delivery processing (second type) according to the first embodiment.

FIG. 19 is a diagram illustrating an example of the image delivery processing (second type) according to the first embodiment. In this example, by contrast, the selected workflow includes the image-conversion processing. As illustrated in FIG. 19, the MFP 10 transmits the scanned image data to the image processing server 30 together with the delivery setting information. The image processing server 30 acquires the electronic data based on the electronic data identification information contained in the delivery setting information from a file-server 90, for example. If the image identification information is a file ID, the image processing server 30 searches the documents over the network by the file ID and acquires the electronic data associated with the file ID.

Next, the image processing server 30 converts the format A of the image data and the format B of the electronic data into a format C. Next, the image processing server 30 carries out the delivery processing on the image data and the electronic data that are converted in the same data format C.

In FIG. 19, if the scanned image data is image data in a jpeg format on the statement of delivery, and the electronic data are a cover letter made by Microsoft Word, the image data and the electronic data are converted into a PDF, with the converted image data of the cover letter being placed in the front page, and the image processing server 30 carries out the delivery processing on the obtained PDF.

Further, if the selected workflow includes the image-conversion processing, whether to convert the electronic data into the same format as the image data may be selected by the user. If the electronic data is converted into the image data (e.g., PDF), it is preferable that the user specify the place of the scanned image data to which the converted electronic data (i.e., image data) are inserted. For example, after desired electronic data are selected on the electronic data selection screen, the UI control section 102 instructs the display section 18 to display an image-conversion selection screen so that the user can select whether to carry out the image-conversion on the selected electronic data. If the user determines to carry out the image-conversion on the selected electronic data, the UI control section 102 may instruct the display section 18 to display an input screen on which the user can specify the place to insert the converted electronic data (image data).

<Operation>

Figure 20:
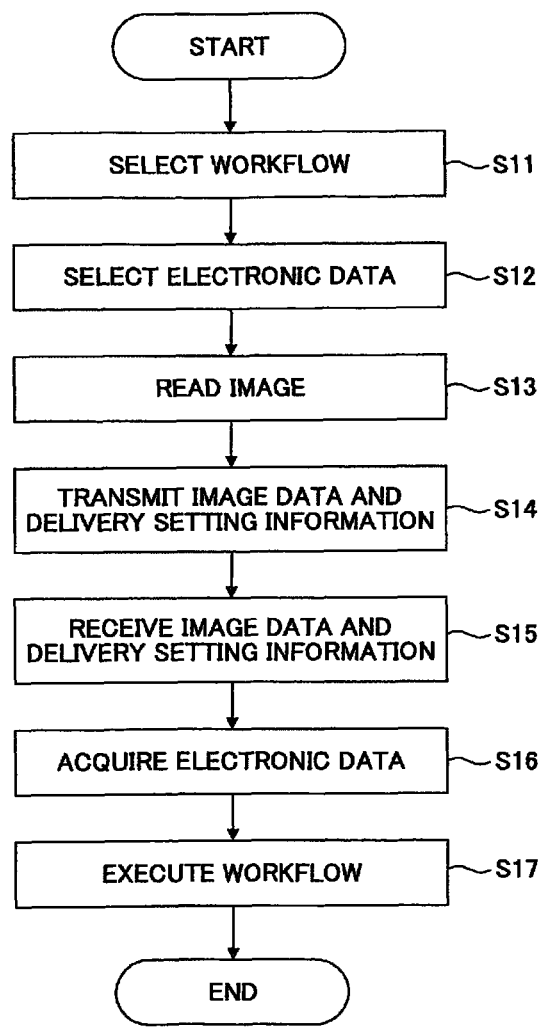
FIG. 20 is a flowchart illustrating an example of image delivery processing according to the first embodiment.

Next, operations of the image processing system according to the first embodiment is described. FIG. 20 is a flowchart illustrating an example of image delivery processing according to the first embodiment. In step S11, the flow selection section 121 instructs the display section 18 to display a workflow selection screen and receives a selected one of the workflows specified by the user.

In step S12, the electronic data selection section 122 instructs the display section 18 to display an electronic data selection screen and receives a selected one of the electronic data specified by the user or the electronic data directly input by the user.

In step S13, the image forming section 103 scans (reads) a paper-based document to generate corresponding image data.

In step S14, the remote communication section 105 transmits the scanned image data and the delivery setting information including the setting information on the selected workflow or the electronic data identification information to the image processing server 30.

In step S15, the remote communication section 201 receives the transmitted image data and delivery setting information from the MFP 10.

In step S16, the electronic data acquisition section 204 acquires the electronic data based on the electronic data identification information in the delivery setting information. In this case, the electronic data identification information is a file path (location information) that locates the storage destination of the electronic data. The electronic data acquisition section 204 acquires the electronic data tracing the corresponding file path.

In step S17, the workflow execution section 205 controls the execution of the delivery processing on the image data and the electronic data based on the selected workflow. Note that steps S11 and S12 may be carried out in any order. If the electronic data is selected first (i.e., step S12), the selection of the electronic data may be restricted based on a desired one of the restriction information illustrated in FIGS. 12 through 13.

As described above, in the image processing system according to the first embodiment, the scanned image data and the electronic data selected by the user may be delivered based on the selected workflow. Further, in the image processing system according to the first embodiment, the number of the selectable electronic data to be displayed on the electronic data selection screen may be restricted based on the restriction information for narrowing down the selectable electronic data.

[Second Embodiment]

Next, an image processing system according to a second embodiment is described below. In the image processing system according to the second embodiment, the MFP 300 side (MFP 10 in the first embodiment) acquires the selected electronic data, and transmits the acquired electronic data and the scanned image data to an image processing server 400 together with the delivery setting information.

Figure 21:
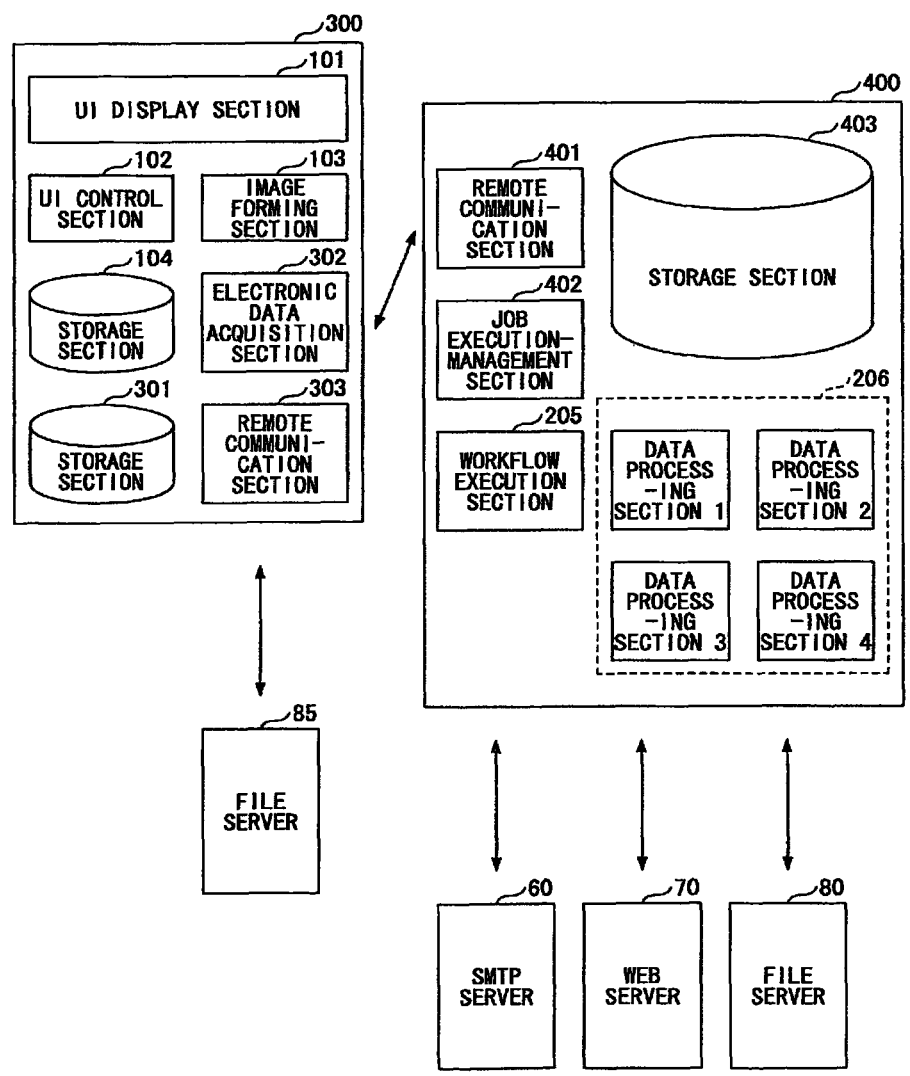
FIG. 21 is a block diagram illustrating a functional configuration example of an image processing system according to a second embodiment.

FIG. 21 is a block diagram illustrating a functional configuration example of the image processing system according to the second embodiment. In the functions illustrated in FIG. 21, the functions similar to those illustrated in FIG. 4 are provided with the same reference numerals and the descriptions thereof are omitted.

As illustrated in FIG. 21, the MFP 300 includes a UI display section 101, a UI control section 102, an image forming section 103, a storage section 104, a storage section 301, an electronic data acquisition section 302, and a remote communication section 303. The storage section 301 is configured to store optional electronic data. For example, the storage section 301 stores scanned image data, copied image data, or data received via FAX as electronic data.

The basic function of the electronic data acquisition section 302 is the same as that of the electronic data acquisition section 204; however, the electronic data acquisition section 302 is provided in the MFP 300 in the second embodiment. If the storage destination obtained from the electronic data identification information is a file server 85, the electronic data acquisition section 302 acquires the electronic data via the remote communication section 303 based on the electronic data identification information. Further, if the storage destination obtained from the electronic data identification information is the storage section 301, the electronic data acquisition section 302 acquires the electronic data from the storage section 301.

The remote communication section 303 transmits the scanned image data, the acquired electronic data, and the delivery setting information to the image processing server 400.

The image processing server 400 includes a remote communication section 401, a job execution-management section 402, a storage section 403, a workflow execution section 205, and a data processing section 206. The storage section 401 stores the image data, the electronic data, and the delivery setting information combined by the job execution-management section 402.

The remote communication section 401 receives the image data, the electronic data, and the delivery setting information from the MFP 300. The received image data, electronic data and delivery setting information are supplied to the job execution-management section 402.

The job execution-management section 402 combines the image data, electronic data and delivery setting information received from the remote communication section 401 into a job and stores the job in the storage section 403. The storage section 403 is configured to store the image data, the electronic data, and the delivery setting information. Subsequent processing is the same as that described in the first embodiment, and the description thereof is thus omitted.

Accordingly, in the second embodiment, the electronic data are acquired by the MFP 300 side, and the acquired electronic data are then transmitted to the image processing server 400.

[Third Embodiment]

Next, an image processing system according to a third embodiment is described below. In the third embodiment, the electronic data are not selected on the electronic data selection screen; however, the electronic data identification information is converted into a barcode or a QR code which are attached to the corresponding image data. In this case, the electronic data identification information is automatically acquired by allowing an image processing server 600 to carry out OCR processing or OMR processing on the attached barcode or QR code.

Figure 22:
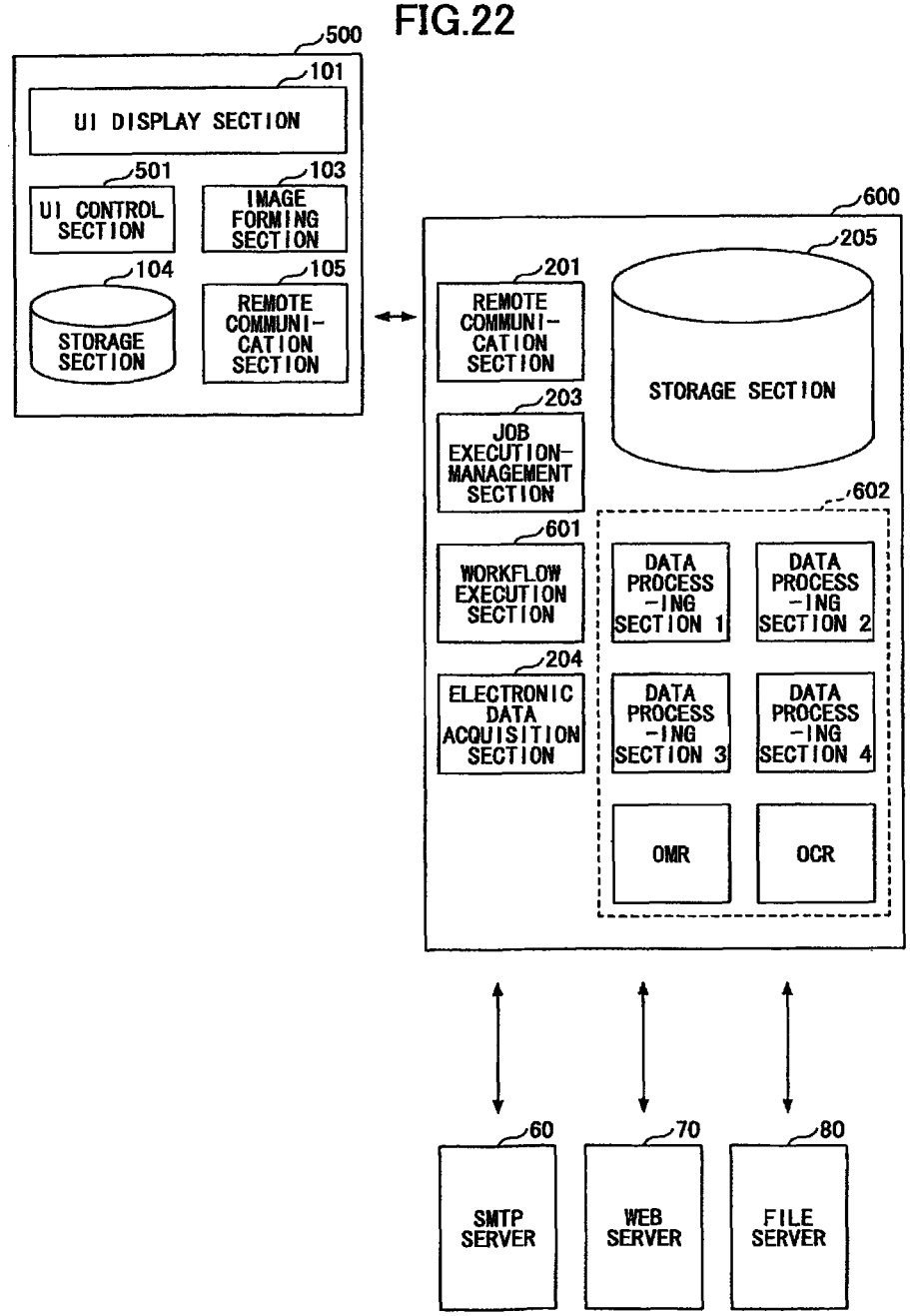
FIG. 22 is a block diagram illustrating a functional configuration example of an image processing system according to a third embodiment.

FIG. 22 is a block diagram illustrating a functional configuration example of the image processing system according to the third embodiment. In the functions illustrated in FIG. 22, the functions similar to those illustrated in FIG. 4 are provided with the same reference numerals and the descriptions thereof are omitted.

The MFP 500 includes a UI display section 101, a UI control section 501, an image forming section 103, a storage section 104, and a remote communication section 105. Since the MFP 500 includes the UI control section 501, the electronic data selection section 122 is excluded.

The remote communication section 105 transmits the image data including the barcode or the like, and the delivery setting information to the image processing server 600.

The image processing server 400 includes a remote communication section 201, a job execution-management section 203, a storage section 202, a workflow execution section 601, a data processing section 602, and an electronic data acquisition section 204.

The workflow execution section 601 initially controls the execution of OCR processing or OMR processing on the image data. The OCR processing acquires the electronic data identification information by carrying out image recognition processing. Likewise, the OMR processing acquires the electronic data identification information by carrying out mark recognition processing. The acquired electronic data identification information is supplied to the electronic data acquisition section 204. Processing subsequent to the electronic data acquisition carried out by the electronic data acquisition section 204 is the same as that described in the first embodiment, and the description thereof is thus omitted.

In the third embodiment, the electronic data are not selected on the electronic data selection screen. The electronic data identification information is converted into a barcode or a QR code and they are attached to the corresponding image data, so that the electronic data are automatically acquired by carrying out the appropriate processing on the barcode or the like.

[Fourth Embodiment]

Next, an image processing system according to a fourth embodiment is described below. In the fourth embodiment, a scanner apparatus 700 having no UI display section 101 or the like is used in place of the MFP 10 of the first embodiment, and hence the user is not allowed to select optional electronic data. Thus, the electronic data may need either to be automatically selected by an image processing server 800 or to be selected by the administrator in advance.

Figure 23:
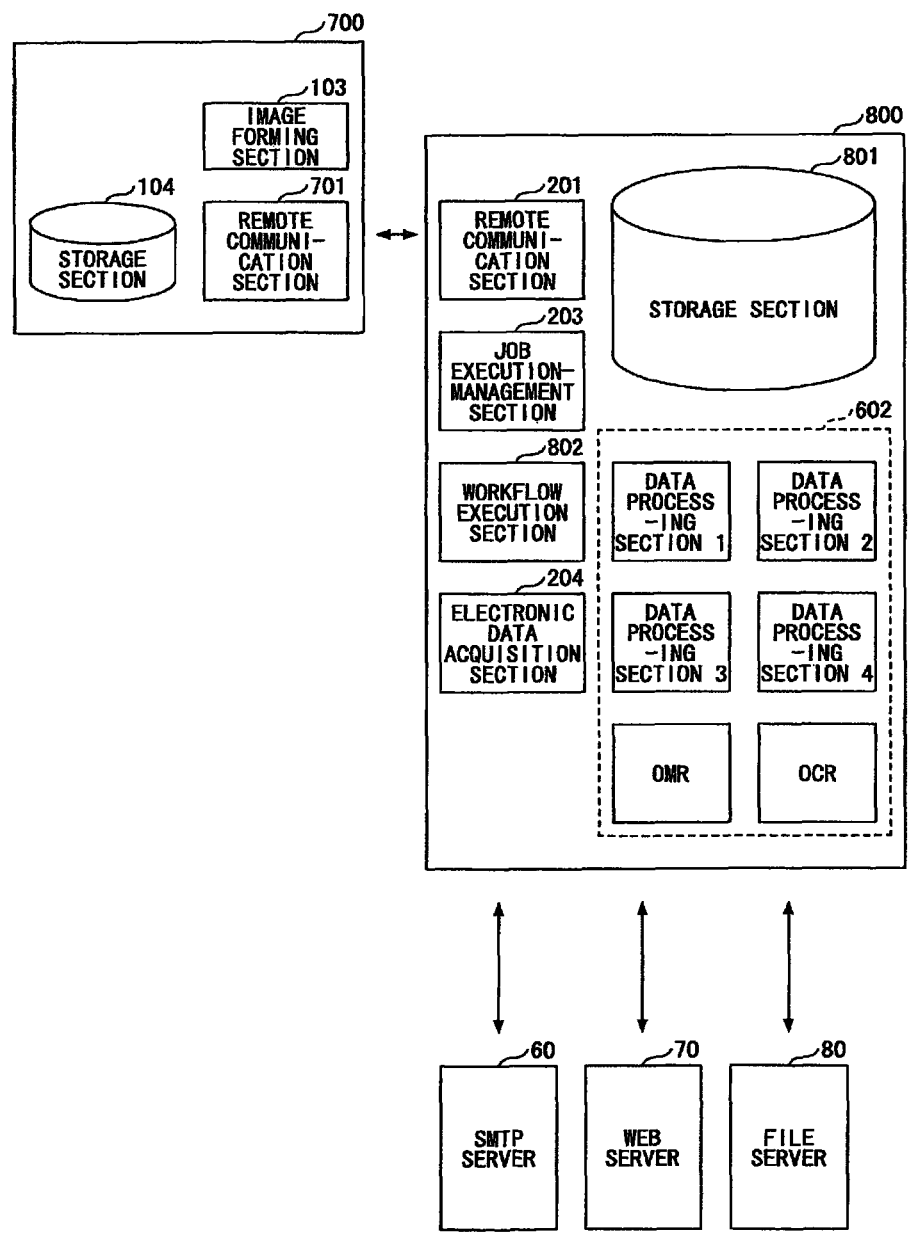
FIG. 23 is a block diagram illustrating a functional configuration example of an image processing system according to a fourth embodiment.

FIG. 23 is a block diagram illustrating-a functional configuration example of the image processing system according to a fourth embodiment. In the functions illustrated in FIG. 23, the functions similar to those illustrated in FIG. 4 are provided with the same reference numerals and the descriptions thereof are omitted.

The scanner apparatus 700 includes an image forming section 103, a storage section 104, and a remote communication section 701. The remote communication section 701 transmits image data to the image processing server 800.

The image processing server 800 includes a remote communication section 201, a job execution-management section 203, a storage section 801, a workflow execution section 802, a data processing section 602, and an electronic data acquisition section 204.

The storage section 801 does not require screen information, because the scanner apparatus includes no UI functions. The storage section 801 may store the restriction information such as those illustrated in FIGS. 14A and 14B, 15, and 16.

The workflow execution section 802 initially controls the execution of OCR processing or OMR processing on the image data. The OCR processing acquires the electronic data identification information by carrying out image recognition processing. Likewise, the OMR processing acquires the electronic data identification information by carrying out mark recognition processing. Accordingly, if there are some image data including the electronic data identification information, the workflow execution section 802 may acquire deliverable electronic data.

Further, if the workflow execution section 802 is unable to obtain the electronic data identification information by carrying out the OCR processing or OMR processing, the workflow execution section 802 acquires the electronic data based on the restriction information stored in the storage section 801. The acquired electronic data identification information is supplied to the electronic data acquisition section 204. Processing subsequent to the electronic data acquisition carried out by the electronic data acquisition section 204 is the same as that described in the first embodiment, and the description thereof is thus omitted.

As described in the fourth embodiment, even if the scanner apparatus 700 (i.e., a special purpose machine) having no UI display section 101 or the like is used in place of the MFP 10 of the first embodiment, the image data or the electronic data may be made deliverable.

[Fifth Embodiment]

Figure 24:
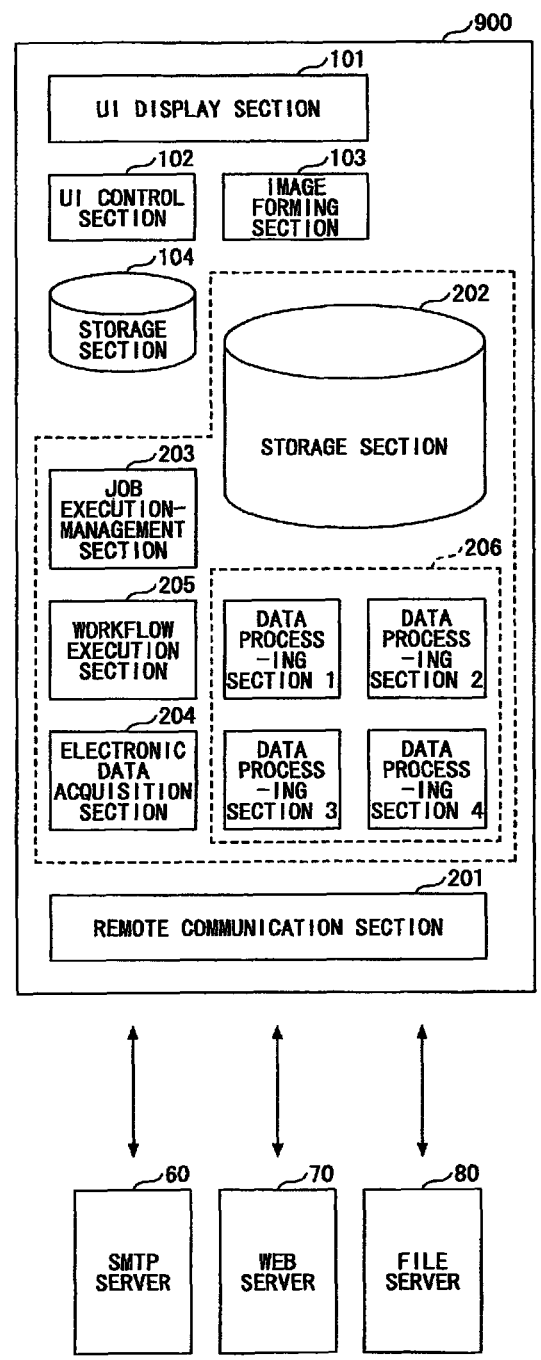
FIG. 24 is a block diagram illustrating a functional configuration example of an image forming apparatus (i.e., MFP) according to a fifth embodiment.

Next, an image forming apparatus according to a fifth embodiment is described below. In the fifth embodiment, an MFP 900 incorporates an image processing server similar to the aforementioned image processing server 30 of the first embodiment. FIG. 24 is a block diagram illustrating a functional configuration example of the image forming apparatus 900 according to the fifth embodiment. As illustrated in FIG. 24, functions of the MFP 900 incorporating the image processing server are basically identical to those of the MFP 10 and the image processing server 30 illustrated in FIG. 4. With this configuration, the MFP 900 according to the fifth embodiment alone is capable of carrying out the various types of processing described in the first and fourth embodiments.

Note that the above-described electronic data acquisition section in the above embodiments may not sometimes acquire the electronic data if the corresponding storage section has deleted the electronic data. In such a case, inability to acquire the electronic data from the electronic data acquisition section may be reported to the MFP, and the MFP may display an error message.

Further, the electronic data may be deleted because the electronic data may have been backed up in an archived file. In this case, the electronic data acquisition section needs a file ID and the like for searching the backed up files for the electronic data. Accordingly, a file path and a file ID may be used as the electronic data identification information. If the electronic data acquisition section is unable to find the electronic data at the position indicated by the file path, the electronic data acquisition section may search the backed up files by the file ID.

The storage destination for the electronic data includes, but not limited to, a database or a memory that can be accessed by the electronic data acquisition section.

Note that the image processing servers of the first and fourth embodiments each include a control device such as a CPU, storage devices such as a read-only memory (ROM) and a random-access memory (RAM), and external devices such as a hard-disk drive (HDD) and a CD-drive device, which is a hardware configuration utilizing a workstation or a normal computer.

Note that computer programs to be executed in the image processing servers according to the first and fourth embodiments or the MFP according to the fifth embodiment are provided, as installable or executable formatted files, recorded on a computer-readable recording medium such as a CD-ROM, flexible disk (FD), CD-R, DVD (Digital Versatile Disk), and the like.

Alternatively, the computer programs to be executed in the image processing servers according to the first and fourth embodiments or the MFP according to the fifth embodiment may be stored in a computer connected via the network, and the stored computer programs are downloaded from the computer via the network. Further, the computer programs to be executed in the image processing servers according to the first and fourth embodiments or the MFP according to the fifth embodiment may be provided or distributed via the network such as the Internet.

Further, the computer programs to be executed in the image processing servers according to the first and fourth embodiments or the MFP according to the fifth embodiment may be recorded on the ROM in advance and the computer programs may be provided as the ROM.

The computer programs to be executed in the image processing servers according to the first and fourth embodiments or the MFP according to the fifth embodiment are configured as modules including the aforementioned types of processing, which are recorded on the computer-readable medium. The modules recorded on the computer-readable medium are, when retrieved from the computer-readable recording medium and executed by a processor (i.e., a CPU), loaded on the primary memory to generate the aforementioned types of processing.

It should be noted that the above described embodiments are not limited thereto. Various changes and alterations may be made to the elements based on the applications of the embodiments without departing from the scope of the invention. In addition, various inventions may be made by appropriately combinationing the elements disclosed in the aforementioned embodiments. For example, some of the elements disclosed in the aforementioned embodiments may be eliminated. Further, the different elements disclosed in the aforementioned embodiments may appropriately be combined.

According to the aforementioned embodiments, the scanned image data and the electronic data may be made selectable so that the selected image data and electronic data are capable of being electronically delivered based on the workflow.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese priority application No. 2009-192341 filed on Aug. 21, 2009, the entire contents of which are hereby incorporated by reference.

What is claimed is:

1. An image processing apparatus connected to a delivery server storing a predetermined electronic data via a network, the image processing apparatus, comprising:

an image forming apparatus configured to read a document to generate image data, the image data being generated in a first format;

a workflow selector configured to select a desired one of workflows using the image data, each of the workflows indicating a selected sequence of operations for processing the image data, the selected sequence of operations including at least one desired delivery type for delivering the image data, the selected sequence of operations including a first operation for converting the image data into a desired format and a second operation for converting electronic data into the desired format;

a data selector configured to,
receive identification information, and
specify electronic data to be delivered together with the image data based on the received identification information, the specified electronic data being in a second format, and
restrict a selection of the electronic data based on restriction information, the restriction information indicating that at least a portion of the electronic data is to be restricted based on the selected one of the workflows, and
in restricting the selection of the electronic data, the data selector is configured to restrict the at least a portion of the electronic data from being displayed on an electronic data display screen based on the restriction information; and a transmitter configured to send to the delivery server the specified electronic data, the image data, and a request for processing the selection of the electronic data, and the image data based on the selected one of the workflows, as delivery setting information for processing electronic data stored in the delivery server and image data generated by the image processing apparatus based on the selected one of the workflows, the delivery server using the delivery setting information to perform the selected sequence of operations including the first operation and the second operation according to the selected one of the workflows.

2. The image processing apparatus as claimed in claim 1, wherein,
the restriction information defines requirements for the electronic data based on delivery types contained in the workflows, and
the data selector allows the electronic data to be selectable if the electronic data satisfies the requirements for the delivery types contained in the selected one of the workflows.

3. The image processing apparatus as claimed in claim 1, wherein,
the restriction information defines requirements for the electronic data based on delivery destinations contained in the workflows, and
the data selector allows the electronic data to be selectable if the electronic data satisfies the requirements for the delivery destinations contained in the selected one of the workflows.

4. The image processing apparatus as claimed in claim 1, wherein
the restriction information defines requirements for the electronic data based on different users, and
the data selector allows the electronic data to be selectable if the electronic data satisfies the requirements for the different users who have logged into the image forming apparatus.

5. The image processing apparatus as claimed in claim 1, wherein,
the restriction information includes bibliographic information on the generated image data associated with the electronic data, and
the data selector allows the electronic data to be selectable if the electronic data is associated with a corresponding one of the bibliographic information on the generated image data.

6. The image processing apparatus as claimed in claim 1, wherein, the restriction information includes authorization information corresponding to different users, the authorization information being associated with the electronic data, and the data selector acquires the authorization information corresponding to one of the users who has logged into the image forming apparatus and allows the electronic data to be selectable if the electronic data is associated with the authorization information corresponding to the user who has logged into the image forming apparatus.

7. An method for processing image data using an image processing apparatus connected to a delivery server storing a predetermined electronic data via a network, the image processing apparatus, the method comprising:

reading, by an image processing apparatus, a document to generate image data;

selecting, by the image processing apparatus, a desired one of workflows using the image data, each of the workflows indicating a selected sequence of operations for processing the image data, the selected sequence of operations including at least one desired delivery type for delivering the image data, the selected sequence of operations including a first operation for converting the image data into a desired format and a second operation for converting electronic data into the desired format;

receiving, by the image processing apparatus, identification information;

specifying, by the image processing apparatus, electronic data to be delivered together with the image data based on the received identification information;

restricting a selection of the electronic data based on restriction information, the restriction information indicating that at least a portion of the electronic data is to be restricted based on the selected one of the workflows, and the restricting the selection of the electronic data includes restricting the at least a portion of the electronic data from being displayed on an electronic data display screen based on restriction; and sending, by the image processing apparatus to the delivery server, the specified electronic data, the image data, and a request for processing the selection of the electronic data, and the image data based on the selected one of the workflows, as delivery setting information for processing electronic data stored in the delivery server and image data generated by the image processing apparatus based on the selected one of the workflows, the delivery server using the delivery setting information to perform the selected sequence of operations including the first operation and the second operation according to the selected one of the workflows.

8. The method of claim 7, wherein the restriction information defines requirements for the electronic data based on delivery types contained in the workflows, and the selecting further comprises:

allowing the electronic data to be selectable if the electronic data satisfies the requirements for the delivery types contained in the selected one of the workflows.

9. The method of claim 7, wherein the restriction information defines requirements for the electronic data based on delivery destinations contained in the workflows, and the selecting further comprises:

allowing the electronic data to be selectable if the electronic data satisfies the requirements for the delivery destinations contained in the selected one of the workflows.

10. The method of claim 7, wherein the restriction information defines requirements for the electronic data based on different users, and the selecting further comprises:

allowing the electronic data to be selectable if the electronic data satisfies the requirements for the different users who have logged into the image forming apparatus.

11. The method of claim 7, wherein the restriction information includes bibliographic information on the generated image data associated with the electronic data, and the selecting further comprises:

allowing the electronic data to be selectable if the electronic data is associated with a corresponding one of the bibliographic information on the generated image data.

12. The method of claim 7, wherein the restriction information includes authorization information corresponding to different users, the authorization information being associated with the electronic data, and the selecting further comprises:

acquiring the authorization information corresponding to one of the users who has logged into the image forming apparatus and allows the electronic data to be selectable if the electronic data is associated with the authorization information corresponding to the user who has logged into the image forming apparatus.

13. An image delivery system, comprising:

an image processing apparatus including, an image forming apparatus configured to read a document to generate image data, a workflow selector configured to select a desired one of workflows using the image data, each of the workflows indicating a selected sequence of operations for processing the image data, the selected sequence of operations including at least one desired delivery type for delivering the image data, the selected sequence of operations including a first operation for converting the image data into a desired format and a second operation for converting electronic data into the desired format, a data selector configured to, receive identification information, the identification information being stored in a delivery processing apparatus, and specify electronic data to be delivered together with the image data based on the received identification information, restrict a selection of the electronic data based on restriction information, the restriction information indicating that at least a portion of the electronic data is to be restricted based on the selected one of the workflows, and in restricting the selection of the electronic data, the data selector is configured to restrict the at least a portion of the electronic data from being displayed on an electronic data display screen based on the restriction information, and a transmitter configured to transmit to the image delivery system the specified electronic data, the generated image data, and a request for causing the identification information and generated image data to be processed according to the selected one of the workflows as delivery setting information; and the delivery processing apparatus including, a receiver configured to receive the delivery setting information, an electronic data acquirer configured to acquire the electronic data stored in the delivery processing apparatus based on the identification information of the electronic data contained in the received delivery setting information, a data processor to perform the selected sequence of operations including the first operation and the second operation according to the selected one of the workflows, and a delivery controller configured to control delivery of the acquired electronic data and the image data according to the delivery type indicated by the selected on of the workflows.

* * * * *